United States Patent
Schneider

(10) Patent No.: US 8,533,533 B2
(45) Date of Patent: Sep. 10, 2013

(54) MONITORING PROCESSES VIA AUTOCORRELATION

(75) Inventor: James Paul Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 300 days.

(21) Appl. No.: 12/395,081

(22) Filed: Feb. 27, 2009

(65) Prior Publication Data

US 2010/0223497 A1 Sep. 2, 2010

(51) Int. Cl.
*G06F 11/00* (2006.01)

(52) U.S. Cl.
USPC ........ 714/38.1; 714/47.1; 714/47.2; 714/47.3

(58) Field of Classification Search
USPC .................. 714/38, 47, 38.1, 47.1, 47.2, 47.3
See application file for complete search history.

(56) References Cited

U.S. PATENT DOCUMENTS

| | | | | |
|---|---|---|---|---|
| 6,532,554 B1 * | 3/2003 | Kakadia | | 714/43 |
| 7,210,073 B1 * | 4/2007 | Landwehr et al. | | 714/47 |
| 7,254,750 B1 * | 8/2007 | Okun et al. | | 714/47 |
| 7,313,613 B1 * | 12/2007 | Brooking et al. | | 709/223 |
| 7,360,121 B2 * | 4/2008 | Srivastava et al. | | 714/47 |
| 7,373,554 B2 * | 5/2008 | Chandrasekaran | | 714/38 |
| 7,373,556 B2 * | 5/2008 | Srivastava et al. | | 714/47 |
| 7,475,292 B2 * | 1/2009 | Avritzer et al. | | 714/47 |
| 7,478,149 B2 * | 1/2009 | Joshi et al. | | 709/223 |
| 7,484,128 B2 * | 1/2009 | Bondi et al. | | 714/38 |
| 7,493,523 B2 * | 2/2009 | Bose et al. | | 714/38 |
| 7,530,072 B1 * | 5/2009 | Cheaz | | 718/104 |
| 7,657,793 B2 * | 2/2010 | Avritzer | | 714/38 |
| 7,788,536 B1 * | 8/2010 | Qureshi et al. | | 714/38 |
| 7,836,354 B2 * | 11/2010 | Underwood | | 714/47 |
| 7,992,054 B2 * | 8/2011 | Raghunandan | | 714/47.2 |
| 8,171,347 B2 * | 5/2012 | Neary | | 714/47.1 |
| 8,219,856 B2 * | 7/2012 | Martinez et al. | | 714/38.1 |
| 8,266,624 B2 * | 9/2012 | Eigler et al. | | 718/103 |
| 2006/0026467 A1 * | 2/2006 | Nehab et al. | | 714/38 |
| 2008/0010556 A1 * | 1/2008 | Vaidyanathan et al. | | 714/47 |
| 2008/0189413 A1 * | 8/2008 | Srivastava et al. | | 709/224 |
| 2008/0256544 A1 * | 10/2008 | Eigler et al. | | 718/103 |
| 2008/0294942 A1 * | 11/2008 | Breitgand et al. | | 714/38 |
| 2008/0307266 A1 * | 12/2008 | Chandrasekaran | | 714/38 |
| 2008/0307267 A1 * | 12/2008 | Chandrasekaran | | 714/38 |
| 2009/0193298 A1 * | 7/2009 | Mukherjee | | 714/38 |
| 2011/0296246 A1 * | 12/2011 | Cooper et al. | | 714/38.1 |
| 2012/0042214 A1 * | 2/2012 | Jacobs et al. | | 714/47.2 |
| 2013/0024731 A1 * | 1/2013 | Shochat et al. | | 714/38.1 |

OTHER PUBLICATIONS

Atwood, Jeff. "Understanding User and Kernel Mode." Coding Horror: programming and human factors. Jan. 3, 2008. Web. Nov. 2011. <http://www.codinghorror.com/blog/2008/01/understanding-user-and-kernel-mode.html>.*

"User space." Wikipedia, The free Encyclopedia. Wikimedia Foundation, Inc. Jan. 22, 2009. Web. Nov. 10, 2011. <http://en.wikipedia.org/w/index.php?title=User_space&oldid=265696828>.*

Basu, et al.; "Why Did My PC Suddenly Slow Down?"; Microsoft Research; 6 pages. Apr. 2007.

* cited by examiner

*Primary Examiner* — Joshua P Lottich
(74) *Attorney, Agent, or Firm* — Lowenstein Sandler LLP

(57) ABSTRACT

A method and apparatus including a monitoring and correction module that monitors process metrics to identify a steady-state for a process, detects a deviation from the steady-state for the process, and executes a corrective measure automatically to reduce an impact of the process in response to the deviation by a monitoring and correction module. The monitoring and correction module also analyzes the deviation to determine whether the deviation is negatively impact in performance for other processes.

20 Claims, 4 Drawing Sheets

MONITORING PROCESSES VIA AUTOCORRELATION

TECHNICAL FIELD

Embodiments of the present invention relate to a system for monitoring and correcting problems in a computer system at the process level. Specifically, the embodiments of the invention relate to a method and apparatus for detecting process deviation from a steady-state and automatically implementing corrective measures to prevent the process from impacting other processes negatively.

BACKGROUND

Operating systems are responsible in computer systems for managing processes. Processes are executing instances of a computer program or components of a computer program. Thus, managing process allows the operating system to control the computer programs that are being executed in the computer system. The operating system manages the resources given to each process including central processing unit (CPU) time, input/output (I/O) bandwidth, peripheral input device availability, memory usage and similar system resources. User programs and operating system utilities can be installed that enable the monitoring of the utilization of many of these resources by each process. The monitoring programs and monitoring data are largely utilized to enable system administrators to manually identify a process that might be responsible for a system slow down or the unavailability of certain resources. Similarly, the monitoring programs and utilities can identify an absolute amount (i.e., total memory) or percentage (i.e., percent of processor time) of a resource that is being utilized by each process. This also assists a user or administrator to identify those processes that are occupying a particular resource.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Described herein is a method and apparatus for process monitoring and correction. The method and apparatus monitor process metrics and identify a steady-state for each metric for each process. The metrics are then monitored for deviations from the steady-state. If a deviation from a steady-state is detected then the deviation is analyzed to determine the cause of the deviation. If the deviation is determined to be negatively impacting the overall system performance or other specific processes, then corrective measures can be initiated. The corrective measures seek to limit the impact of the process that has been identified as causing the problem by either diminishing or restricting the resources available to that process or conversely increasing them. Once the problem has been addressed, then the restrictions on or increases in resource availability can be adjusted back to the level that they were set at prior to the deviation from the steady-state.

Figure 1:
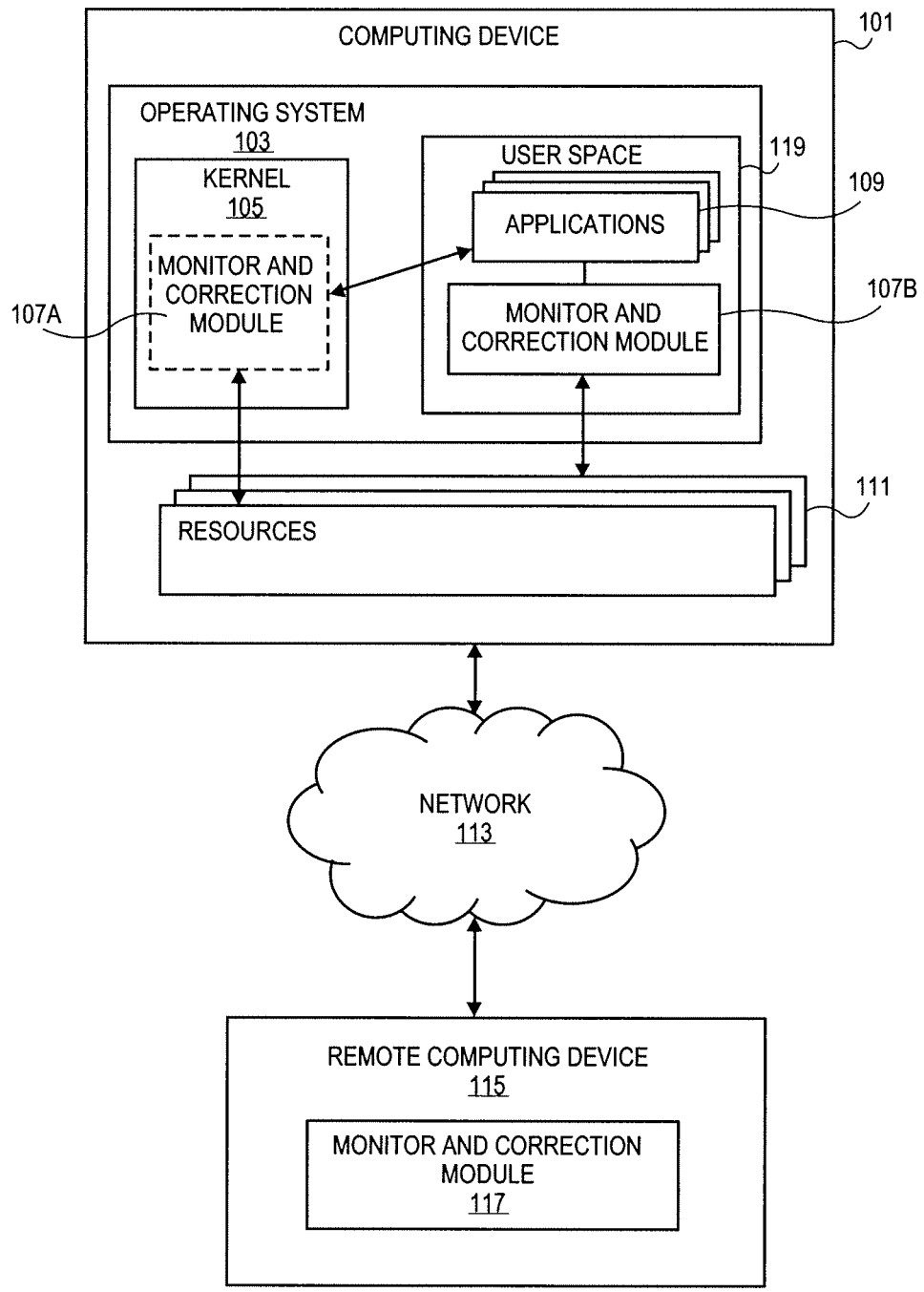
FIG. 1 is a diagram of one embodiment of a system for monitoring and correcting processes.

FIG. 1 is a diagram of one embodiment of a system including a monitor and correction module. The system includes a computing device 101. The computing device 101 can be any type of computing device including a desktop computer, laptop computer, a work station, a server, a console device or similar computing device. The computing device 101 includes an operating system 103 and set of resources 111. The operating system 103 can be any type of operating system including a WINDOWS® operating system by Microsoft Corporation of Redmond, Wash., a Linux operating system or a similar operating system. The computing device 101 can have any set of resources 111. Resources 111 can include memory devices, persistent storage devices (e.g., fixed disk drives, removable media drives, and similar storage devices), peripheral devices, communication devices and similar resources.

The operating system 103 can define a set of program execution environments such as the kernel 105 and user space 119. The kernel 105 embodies the core functionality of an operating system including the generation and management of processes and the management of system resources 111. In one embodiment, the monitor and correction module 107A is incorporated into the kernel 105. Incorporating the monitor and correction module 107A into the kernel 105 provides more direct access to management functions for processes and more direct access to some metric information. However, incorporation of the monitor and correction module 107A into kernel 105 restricts the flexibility of the configuration of the operating system 103 and introduces additional complexity into the kernel 105 and could therefore reduce the stability or reliability of the kernel 105.

The user space 119 defines a space for the execution of applications 109. The user space 119 enables the applications 109 to interface with the kernel 105 and system resources 111 without being integral to the execution of the operating system 103 and the functioning of the computing device 101. In one embodiment, the monitor and correction module 107B is executing in the user space 119. Placement of the monitor and correction module 107B in the user space 119 diminishes the direct access of the monitor and correction module 107B to process management functionality and metrics. However, the placement of the monitor and correction module 107B in the user space 119 decreases the likelihood that the monitor and correction module 107B will impact the performance of the operating system 103 and computing device 101 and provides greater flexibility in the configuration of the operating system 103. The functionality of the monitor and correction module 107A, 107B is discussed in greater detail in regard to FIG. 2. The monitor and correction module 107A, 107B monitors resource usage per process or similar unit of execution. One of ordinary skill in the art would understand that any unit of execution such as a thread or process can be monitored. For sake of clarity, the example of a process has been used herein.

The computing device 101 may be in communication with a remote computing device 115 over a network 113. The network 113 can be any type of network including a local area network (LAN), a wide area network (WAN), such as the Internet, or similar network. The network 113 can be composed of any number of nodes and links including both wired and wireless links and nodes that are network devices, computing devices and similar devices.

In one embodiment, remote computing device 115 implements a monitor and correction module 117. In this embodiment, the functionality of the monitor and correction module is distributed in a client-server or similar distributed computing paradigm. Any combination of functionality can be placed in the local client 107A, 107B and any combination of functionality can be placed in the monitor and correction module 117 on the remote computing device 115. The remote use of monitor and correction module 117 enables process management while minimizing the impact on the local machine (i.e., computing device 101) as well as providing the user or administrator with flexibility in the configuration of the operating system 103 on each computing device in a network 113.

Figure 2:
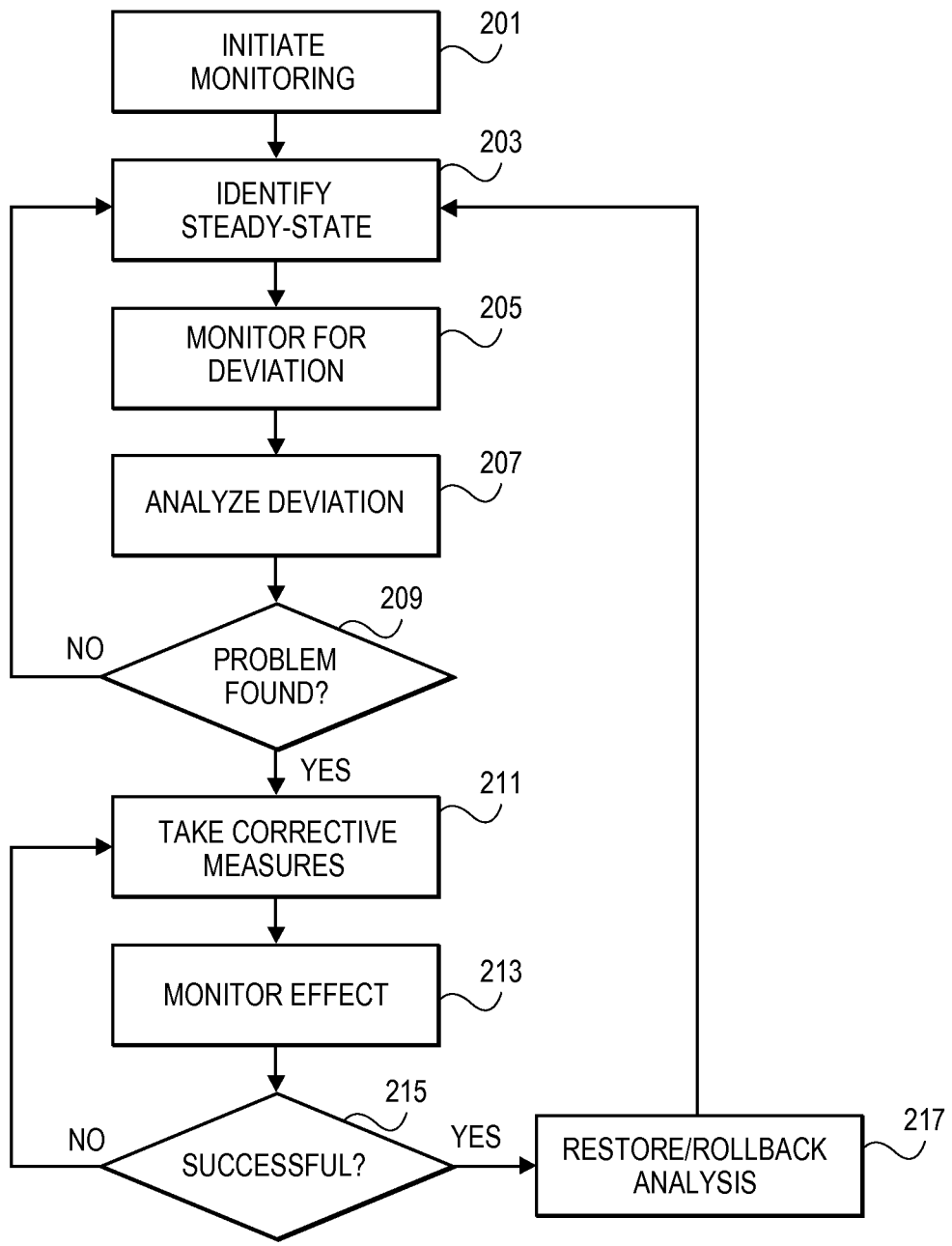
FIG. 2 is a flowchart of one embodiment of a process for monitoring for correcting processes.

FIG. 2 is a flowchart of one embodiment of the process of the monitor and correction module. In one embodiment, the process begins by initiating the monitoring of each of a set of specified processes or resources (Block 201). A "set," as used herein, refers to any positive whole number of items including one item. The set of processes or system resources that are being monitored can be configured by a user of a system or system administrator. Resources that may be monitored can include memory allocation, file opening, processing time, paging statistics, input/output, and similar resources whose use can be measured. The monitor and correcting module may track these metrics by directly polling the specific resources, receiving metric information from the resources or drivers for those resources on a periodic basis or through similar monitoring mechanisms.

The monitor and correction module collects the data for each of the metrics over a specified time period to determine a steady-state for each of the metrics associated with each process in the operating system (Block 203). Any length of time can be utilized or specified for the determination of a steady-state. The length of time parameter can be set by an administrator or user. The parameter can also have default settings. Steady-state values can be determined by averaging, standard deviation, or similar functions for use with time series data.

Once the steady-state for each of the processes has been identified, then the monitor and correction module continues with the monitoring of the metrics to detect deviations in the determined steady-state values (Block 205). A deviation can be a sudden change in the resource utilization to either increase the utilization of a resource beyond a specified first threshold value or decrease the use utilization of a resource beyond a specified second threshold. The threshold for identifying a deviation can be set by a user, administrator or by default settings. The threshold values can have any range or variation dependent on the desired tolerance level for deviation in the system. Similarly, the time frame over which deviations are detected can be set for any time frame that is less than the steady-state time frame. This time frame parameter can be set by a user, administrator or by default settings.

After a deviation has been detected, a process for analyzing a deviation is initiated (Block 207). Analysis of the deviation can include inquiries into the current status of the process associated with the deviation to determine whether the change in resource allocation causing the deviation is typical for the state of the process. For example, if the process is accessing a new file or resource, loading a component or going through a similar state change that represents a transition to a new steady-state then the deviation can be ignored or monitored without taking corrective measures. In contrast, if these conditions are not found then it is assumed that the change in resources is due to a potential problem in the operation or function of the process. The metrics of other processes are also compared to their steady-state levels to determine whether or not the deviation of the process in question is affecting the performance of other processes. In one example embodiment, the analysis of the monitor and correction module is looking for an inverse relationship between the deviation of the primary process and other process of the computer system.

If the deviation is found to be problematic and not a routine transition (Block 209), then corrective measures may be initiated (Block 211). If, however the deviation is determined to be a transition to a new steady-state or similar normal operation of the process, then the monitor and correction module continues by identifying a new steady-state for the process (Block 203).

Corrective measures can be initiated to try and ameliorate the impact of a process that has increased its resource utilization as an effect on other processes in the system. Corrective measures can include lowering a priority of a process in relation to its CPU utilization, invalidating handles, locks or other types of access to other resources that are not in currently in use, invalidating handles, locks or other types of access for resources that are in use, closing the program or process, mapping clean pages associated with the process, suspending the process, shifting the memory allocation for a process such as committed memory or other memory allotments, swapping a process to disk or similar corrective measures that restrict access to resources or the reduce the impact of the process.

A corrective measure can be selected based on the severity of the detected problem. A set of thresholds or triggers, a sequential process or similar process or mechanism can be utilized to determine which corrective measures are to be initiated. Any number of corrective measures can be selected to be implemented at any given time. Implementation of the corrective measures can be through direct action of the monitor and correction program, through interaction with the operating system, or through interaction with the program associated with the process.

After a set of corrective measures has been initiated, the monitor and correction module attempts to track the effect by continuing monitoring of the metrics (Block 213). If the metrics begin trending back towards the previous steady-state, then a determination of the success of the corrective measures can be made in the affirmative (Block 215). However, if the metrics continue to trend in a negative direction away from the steady-state or remain in a new negative steady-state, then the corrective measures can be deemed to be unsuccessful and further corrective measures may be taken (Block 211). A process of monitoring and taking additional corrective measures can be iterated through until all of the corrective measure options have been exhausted, the process has returned to its steady-state or the impact of the process has otherwise been ameliorated.

In one embodiment, if the corrective measures have successfully addressed the performance impact of the process, then the process can continue by resumption of monitoring for deviations (Block 205) or identify a new steady-state (Block 203) dependent on the corrective measure utilized and similar factors. In another embodiment, an analysis can be made to restore or roll back the corrective measures (for example, if the corrective measures are no longer needed or overcompensate for the problem) (Block 217). This restoration or rollback analysis can be done through any process of re-enablement of the process and a monitoring mirroring that of the use of corrective measures and monitoring the effect of the corrective measure on the problem as set forth above. The rollback or restoration can be an iterative process. An equilibrium can be reached between the rollback and the corrective measures and a new steady-state can be identified (Block 203). In other embodiments the corrective measurements can be permanent, timed or similarly configured.

Figure 3:
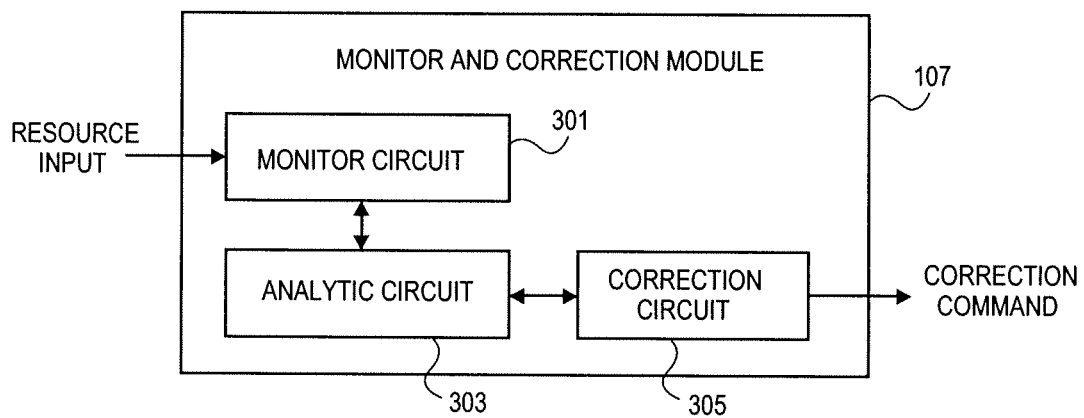
FIG. 3 is a diagram of one embodiment of a monitor and correction module.

FIG. 3 is a diagram of one embodiment of a monitor and correction module. In one embodiment, the monitor and correction module 107 includes a monitor circuit 301, an analysis circuit 303 and a correction circuit 305. One skilled in the art would understand that the functionality of each of these components can be amalgamated or further divided to smaller functions to any level of granularity. This embodiment is present by way of example and for sake of clarity other alternative embodiments are not discussed at length.

In one embodiment, the monitor circuit 301 receives resource input or response to polling or queries of available resources. The received data includes a set of metrics as set forth in the specified set of parameters for the monitor and correction module 107. A monitor circuit 301 collects this data continuously in a time series data structure. This time series data structure is then made available to the analysis circuit 303.

The analysis circuit 303 processes the time series data as it is updated or on an incremental basis to determine the steady-states for each of the set of monitored processes. The analysis circuit 303 also carries out the deviation detection once the steady-state has been determined for each process. If the analysis circuit 303 detects a deviation from a steady-state then an initiation signal or similar notification is sent to a correction circuit 305.

The correction circuit 305 initiates the process of determining the appropriate corrective measure based on the data from the analysis circuit 303, which can indicate the severity of the problem or the correction circuit 305 may iterate through or serially apply a set of corrective measures until a signal is received from the analysis circuit 303 indicating that the deviation has subsided or at least been ameliorated. The correction circuit 305 generates a set of commands or notifications that are issued to other programs such as the operating system, the kernel, a program associated with a monitored process or similar programs, utilities or components of the computing device to affect the desired set of corrective measures.

Figure 4:
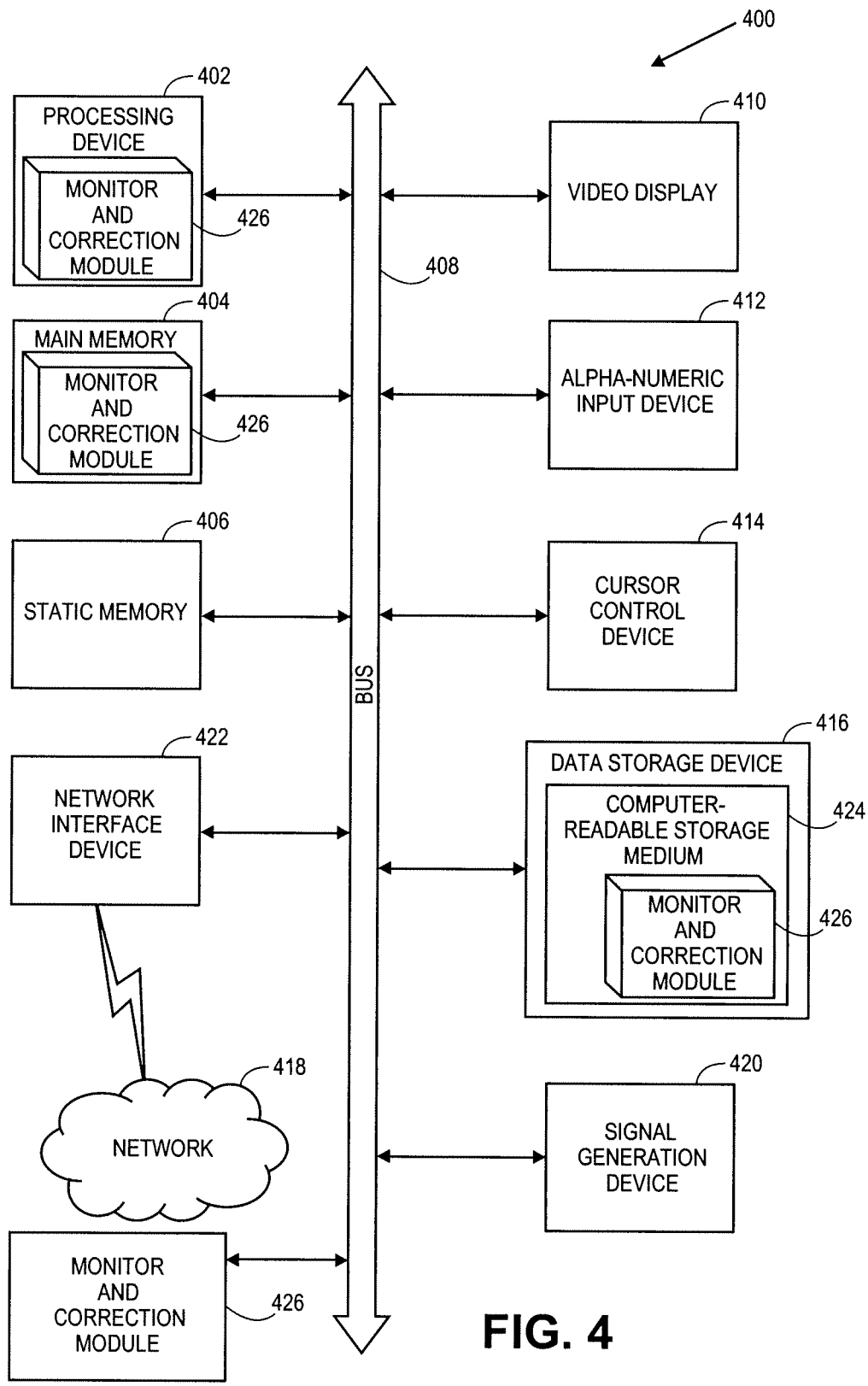
FIG. 4 is a diagram illustrating one embodiment of a system for process monitoring and correction.

FIG. 4 is a diagram illustrating one embodiment of a system for process monitoring and correction. Within the computer system 500 is a set of instructions for causing the computer or other machine to perform any one or more of the methodologies discussed herein. In alternative embodiments, the computer system 500 may be connected (e.g., networked) to other machines in a LAN, an intranet, an extranet, or the Internet. The computer system 500 can operate in the capacity of a server or a client machine (e.g., a client computer executing a client monitor and correction module or a server computer executing a server monitor and correction module) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computer is illustrated, the term "computer" shall also be taken to include any collection of computers or other machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable medium), which communicate with each other via a bus 508.

The processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. In another embodiment, the processing device 502 may also be one or more special-purpose processing devices such as an application specific integrated circuit (ASIC), a field programmable gate array (FPGA), a digital signal processor (DSP), network processor, or the like. The processing device 502 is configured to execute the monitor and correction module 526 for performing the operations and steps discussed herein.

The computer system 500 may further include a network interface device 522. The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions (e.g., monitor and correction module 526) embodying any one or more of the methodologies or functions described herein. The monitor and correction module 526 may also reside, completely or at least partially, within the main memory 504 and/or within the processing device 502 during execution thereof by the computer system 500, the main memory 504 and the processing device 502 also constituting machine-readable storage media. The monitor and correction module 526 may further be transmitted or received over a network 518 via the network interface device 522.

The machine-readable storage medium 524 may also be used to store the monitor and correction module 526 persistently. While the machine-readable storage medium 526 is shown in an exemplary embodiment to be a single medium, the term "machine-readable storage medium" and also "computer-readable medium" should be taken to include a single medium or multiple media (e.g., a centralized or distributed database, and/or associated caches and servers) that store the one or more sets of instructions. The terms "machine-readable storage medium" and "computer-readable medium" shall also be taken to include any medium that is capable of storing or encoding a set of instructions for execution by the machine and that cause the machine to perform any one or more of the methodologies of the present invention. The terms "machine-readable storage medium" and "computer-readable medium" shall accordingly be taken to include, but not be limited to, solid-state memories, and optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "monitoring," "detecting," "executing," "analyzing," "reversing," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems has been described in the description above. In addition, the present invention is not described with reference to any particular programming language. It will be appreciated that a variety of programming languages may be used to implement the teachings of the invention as described herein. Further, while software and hardware embodiments have described herein to illustrate the range of possible implementations, those skilled in the art would understand that any combination of these techniques can be utilized, such that the invention would not have an entirely hardware or software implementation, for example, any of the functions or algorithms described herein could be implemented in microcoded hardware components.

Thus, a method and apparatus for process monitoring and correction has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   monitoring, by a monitoring and correction module of a computing device, metrics for a unit of execution of a process of the computing device, the metrics comprising at least one of memory allocation, file opening, processing time, paging statistics, or input/output;
   identifying, based on the monitoring, a steady-state of each monitored metric by the unit of execution;
   detecting, by the monitoring and correction module, a deviation of a deviating metric of the monitored metrics from the steady-state associated with the deviating metric;
   analyzing, by the monitoring and correction module, the deviation to determine a cause of the deviation;
   determining, by the monitoring and correction module, whether the deviation is related to a transition to a new steady-state for the deviating metric;
   determining whether the cause is acceptable with respect to the transition to the new steady-state at the deviating metric;
   identifying, by the monitoring and correction module, steady-state levels of metrics of other units of execution of other processes of the computing device;
   determining whether the deviation of the deviating metric from its associated steady-state is negatively impacting performance of the other units of execution by causing the metrics of the other units of execution to deviate from their associated steady-state levels;
   when the deviation is not related to the transition to the new steady-state and when the deviation is determined to be negatively impacting performance of the other units of execution, executing a corrective measure that alters availability of resources to the unit of execution in order to reduce an impact of the unit of execution of the process on the computing device; and
   when the deviation is related to the transition to the new steady-state and when the cause is determined to be acceptable with respect to the transition to the new steady-state:
      ignoring the deviation of the metric without executing the corrective measure, and
      associating the new steady-state level with the deviating metric for the unit of execution of the process.

2. The computer-implemented method of claim 1, further comprising:
   monitoring an effect of the corrective measure.

3. The computer-implemented method of claim 1, further comprising:
   executing another corrective measure that is more restrictive in response to a failure of the corrective measure to ameliorate the impact.

4. The computer-implemented method of claim 1, further comprising:
   the corrective measure in response to a reduced impact of the units of execution.

5. The computer-implemented method of claim 1, wherein the corrective measure is to at least one of reduces process priority, memory allotment, releases resources assigned to the process, or terminates the process.

6. The computer-implemented method of claim 1, wherein the deviation is a change in resource utilization over a pre-defined time period that exceeds a pre-defined threshold.

7. The computer-implemented method of claim 1, wherein the unit of execution is of a thread.

8. A non-transitory computer readable storage medium, having instructions stored therein, which when executed, cause a processing device to perform a set of operations comprising:
    monitoring, by a monitoring and correction module executed by the processing device, metrics for a unit of execution of a process of the computing device, the metrics comprising at least one of memory allocation, file opening, processing time, paging statistics, or input/output;
    identifying, based on the monitoring, a steady-state of each monitored metric by the unit of execution;
    detecting, by the monitoring and correction module, a deviation of a deviating metric of the monitored metrics from the steady-state associated with the deviating metric;
    analyzing, by the monitoring and correction module, the deviation to determine a cause of the deviation;
    determining, by the monitoring and correction module, whether the deviation is related to a transition to a new steady-state for the deviating metric;
    determining whether the cause is acceptable with respect to the transition to the new steady-state at the deviating metric;
    identifying, by the monitoring and correction module, steady-state levels of metrics of other units of execution of other processes of the computing device;
    determining whether the deviation of the deviating metric from its associated steady-state is negatively impacting performance of the other units of execution by execution by causing the metrics of the other units of execution to deviate from their associated steady-state levels;
    when the deviation is not related to the transition to the new steady-state and when the deviation is determined to be negatively impacting performance of the other units of execution, executing a corrective measure that alters availability of resources to the unit of execution in order to reduce an impact of the unit of execution of the process on the computing device; and
    when the deviation is related to the transition to the new steady-state and when the cause is determined to be acceptable with respect to transition to the new steady-state:
        ignoring the deviation of the metric without executing the corrective measure; and
        associating the new steady-state level with the deviating metric for the unit of execution of the process.

9. The non-transitory computer readable storage medium of claim 8, having further instructions therein, which when executed, cause the processing device to perform a further set of operations, further comprising monitoring an effect of the corrective measure.

10. The non-transitory computer readable storage medium of claim 8, having further instructions therein, which when executed, cause the processing device to perform a further set of operations, further comprising executing another corrective measure that is more restrictive in response to a failure of the corrective measure to ameliorate the impact.

11. The non-transitory computer readable storage medium of claim 8, having further instructions therein, which when executed, cause the processing device computer to perform a further set of operations, further comprising reversing the corrective measure in response to a reduced impact of the unit of execution.

12. The non-transitory computer readable storage medium of claim 8, wherein the corrective measure is to at least one of reduces process priority, memory allotment, releases resources assigned to the process, or terminates the process.

13. The non-transitory computer readable storage medium of claim 8, wherein the unit of execution is of a thread.

14. An apparatus comprising:
    a memory,
    a processing device communicably coupled to the memory;
    an operating system executed from the memory by the processing device; and
    a monitor and correction component executing in a user space of the operating system, the monitor and correction component comprising:
        a monitor circuit to monitor metrics for a unit of execution of a process of the processing device, the metrics comprising at least one of memory allocation, file opening, processing time, paging statistics, or input/output;
        an analysis circuit coupled to the monitor circuit, the analysis circuit configured to:
            identify a steady-state of each monitored metric by the unit of execution;
            detect a deviation of a deviating metric of the monitored metrics from the steady-state associated with the deviating metric;
            analyze the deviation to determine a cause of the deviation;
            determine whether the deviation is related to a transition to a new steady-state for the deviating metric;
            determine whether the cause is acceptable with respect to the transition to the new steady-state at the deviating metric;
            identify steady-state levels of metrics of other units of execution of other processes of the computing device;
        determine whether the deviation of the deviating metric from its associated steady-state is negatively impacting performance of the other units of execution by causing the metrics of the other units of execution to deviate from their associated steady-state levels; and
        a correction circuit communicably coupled to the monitor and correction component, the correction circuit to:
            when the deviation is not related to the transition to the new steady-state and when the deviation is determined to be negatively impacting performance of the other units of execution, execute a command to adjust resource allocation for the unit of execution of the process to ameliorate an impact of the unit of execution of the process on other units of execution; and
            when the deviation is related to the transition to the new steady-state and when the cause is determined to be acceptable with respect to accepted cause of the transition to the new steady-state:
                ignore the deviation of the metric without executing the corrective measure; and
                associate the new steady-state level with the deviating metric for the unit of execution of the process.

15. The apparatus of claim 14, wherein the monitor and correction component is local to the unit of execution.

16. The apparatus of claim 14, wherein the monitor and correction component is remote to the unit of execution.

17. The apparatus of claim 14, wherein the correction circuit further to
   monitor an effect of the corrective measure; and
   execute another corrective measure that is more restrictive in response to a failure of the corrective measure to ameliorate the impact.

18. The apparatus of claim 14, wherein the correction circuit further to
   monitor an effect of the corrective measure; and
   reverse the corrective measure in response to a reduced impact of the units of execution.

19. The apparatus of claim 14, wherein the corrective measure is to at least one of reduces process priority, memory allotment, releases resources assigned to the process, or terminates the process.

20. The apparatus of claim 14, wherein the deviation is a change in resource utilization over a pre-defined time period that exceeds a pre-defined threshold.

\* \* \* \* \*

UNITED STATES PATENT AND TRADEMARK OFFICE
CERTIFICATE OF CORRECTION

PATENT NO. : 8,533,533 B2
APPLICATION NO. : 12/395081
DATED : September 10, 2013
INVENTOR(S) : James Paul Schneider It is certified that error appears in the above-identified patent and that said Letters Patent is hereby corrected as shown below:

In the Claims

Claim 1, Col. 8, Line 53, "measure, and" should be "measure; and"

Claim 4, Col. 8, Line 66, "the corrective measure" should be "reversing the corrective measure"

Claim 8, Col. 9, Line 39, "units of execution by execution by causing the metrics" should be "units of execution by causing the units"

Claim 8, Col. 9, Line 51, "with respect to transition" should be "with respect to the transition"

Claim 11, Col. 10, Line 3, "processing device computer" should be "processing device"

Claim 14, Col. 10, Line 28, "analysis circuit configured to" should be "analysis circuit to"

Claim 14, Col. 10, Line 62-63, "respect to accepted casue of the transition" should be "respect to the transition"

Signed and Sealed this
Twenty-second Day of April, 2014

Michelle K. Lee
*Deputy Director of the United States Patent and Trademark Office*